United States Patent [19]

Retallick et al.

[11] Patent Number: 4,799,360
[45] Date of Patent: Jan. 24, 1989

[54] METHOD OF BINDING A METAL HYDRIDE TO A SURFACE

[75] Inventors: William B. Retallick, 1432 Johnny's Way, West Chester, Pa. 19382; Paul K. Predecki, Denver, Colo.

[73] Assignee: William B. Retallick, West Chester, Pa.

[21] Appl. No.: 115,647

[22] Filed: Oct. 26, 1987

Related U.S. Application Data

[62] Division of Ser. No. 873,371, Jun. 12, 1986, abandoned.

[51] Int. Cl.⁴ .......................... F28D 7/00; F17C 11/00
[52] U.S. Cl. .......................................... 62/48; 427/387; 165/104.12; 165/133
[58] Field of Search ............................ 62/48; 427/387; 165/104.12, 133

[56] References Cited

U.S. PATENT DOCUMENTS

| | | | |
|---|---|---|---|
| 3,772,066 | 11/1973 | Clark | 427/387 |
| 3,796,686 | 3/1974 | Golitz | 427/387 |
| 3,965,250 | 6/1976 | Ceyzeriat | 427/387 |
| 4,402,915 | 9/1983 | Nishizaki | 62/48 |
| 4,433,063 | 2/1984 | Bernstein | 62/48 |
| 4,599,867 | 7/1986 | Retallick | 62/48 |

Primary Examiner—Sam Silverbert
Attorney, Agent, or Firm—William H. Eilberg

[57] ABSTRACT

The invention discloses a method of binding a metal, capable of forming a metal hydride, to a surface. The invention also includes a composition which can be applied to a surface, and which can be repeatedly hydrided and dehydrided. According to the invention, a metal capable of forming a metal hydride is pulverized, mixed with a binder, and coated onto a support. The choice of the binder is an important aspect of the invention. Because of the expansion and contraction of the metal, due to the hydriding and dehydriding, the binder must be quite elastic. The binder must also be permeable to hydrogen, and must be heat stable. Silicone rubbers meet these requirements, and can be used as binders.

12 Claims, 5 Drawing Sheets

METHOD OF BINDING A METAL HYDRIDE TO A SURFACE

This application is a division of application Ser. No. 873,371, filed June 12, 1986, now abandoned.

BACKGROUND OF THE INVENTION

This invention relates to the binding of a metal, capable of forming a metal hydride, to a surface.

My copending U.S. patent application Ser. No. 695,073, filed Jan. 25, 1985 now U.S. Pat. No. 4,599,867 entitled "Hydrogen Storage Cell" describes a means of storing hydrogen in the form of a metal hydride. The disclosure of the cited application is incorporated by reference herein.

In the structure disclosed in the cited application, the hydride is coated onto the surface of a plurality of metal fins which are attached to heat transfer tubes. The fins are closely spaced, so that the weight of hydrogen stored per unit volume is high, approaching one pound per cubic foot. Because the formation of a metal hydride is quite exothermic, the rate of addition of removal of hydrogen from the cell is limited by the ability of the cell to conduct heat to or from the hydride. The cell disclosed in the cited application provides for rapid heat transfer so that the cell can be used in a heat pump, a hydrogen compressor, or to store hydrogen fuel for a vehicle.

Practical problems are encountered in coating the hydride-forming material onto the working surface. When a metal absorbs hydrogen to form a hydride, the metal expands and evolves heat. When the hydride evolves hydrogen and reverts to the metal, it contracts and absorbs heat. Thus, the binder used to hold the hydride-forming metal to its surface must be elastic, permeable to hydrogen, and must be heat stable. The present invention discloses a method for coating the hydride onto a solid support surface, and disclosed compositions which can be used as binders.

SUMMARY OF THE INVENTION

A metal capable of forming a metal hydride is pulverized, mixed with a binder, and coated onto a support. When the metal absorbs hydrogen to form a hydride, the metal expands and evolves heat. When the hydride evolves hydrogen and reverts to the metal, it contracts and absorbs heat. Thus the binder must be elastic, permeable to hydrogen, and stable at temperatures up to about 260° C. Silicone rubbers, and especially one class of silicone rubbers, have been found to meet these requirements. The preferred class of silicone rubbers are those that vulcanize at room temperature by reacting with moisture in the air. These are known as RTV (room temperature vulcanizing) rubbers.

The silicone rubber prepolymer which has been used in the present invention is polydimethylsiloxane, which is cross-linked by methyl triacetoxysilane, which reacts with moisture to form the final polymer. However, other silicone rubber prepolymers, and/or other cross-linking schemes, can be used. For example, prepolymers such as polymethylphenylsiloxane, polydiphenylsiloxane, or polymethylvinylsiloxane could also be employed.

The invention also includes the use of a water sorbent, such as a molecular sieve, in the path of the hydrogen used in the hydridingdehydriding reactions. It is believed that, in the presence of a metal hydride, minute amounts of water can catalyze the decomposition of the silicone rubber binder, whereby the metal is loosened from the surface. The preferred molecular sieve has a pore size of about 3 Angstroms. for coating a metal, the metal being capable of forming a metal hydride, onto a support, whereby the coating adheres to the support during repeated cycles of hydriding and dehydriding.

It is another object to provide a binder for the metal that is elastic, permeable to hydrogen, and heat stable.

It is another object to provide a system for repeatedly hydriding and dehydriding a metal.

It is another object to provide a hydride-forming material which can undergo many cycles of hydriding and dehydriding without degradation of the material.

It is another object to provide an efficient and reliable means of storing hydrogen by the formation of metal hydrides.

It is another object to enhance the reliability and practicality of heat pumps and of other devices which operate by hydriding and dehydriding a metal.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
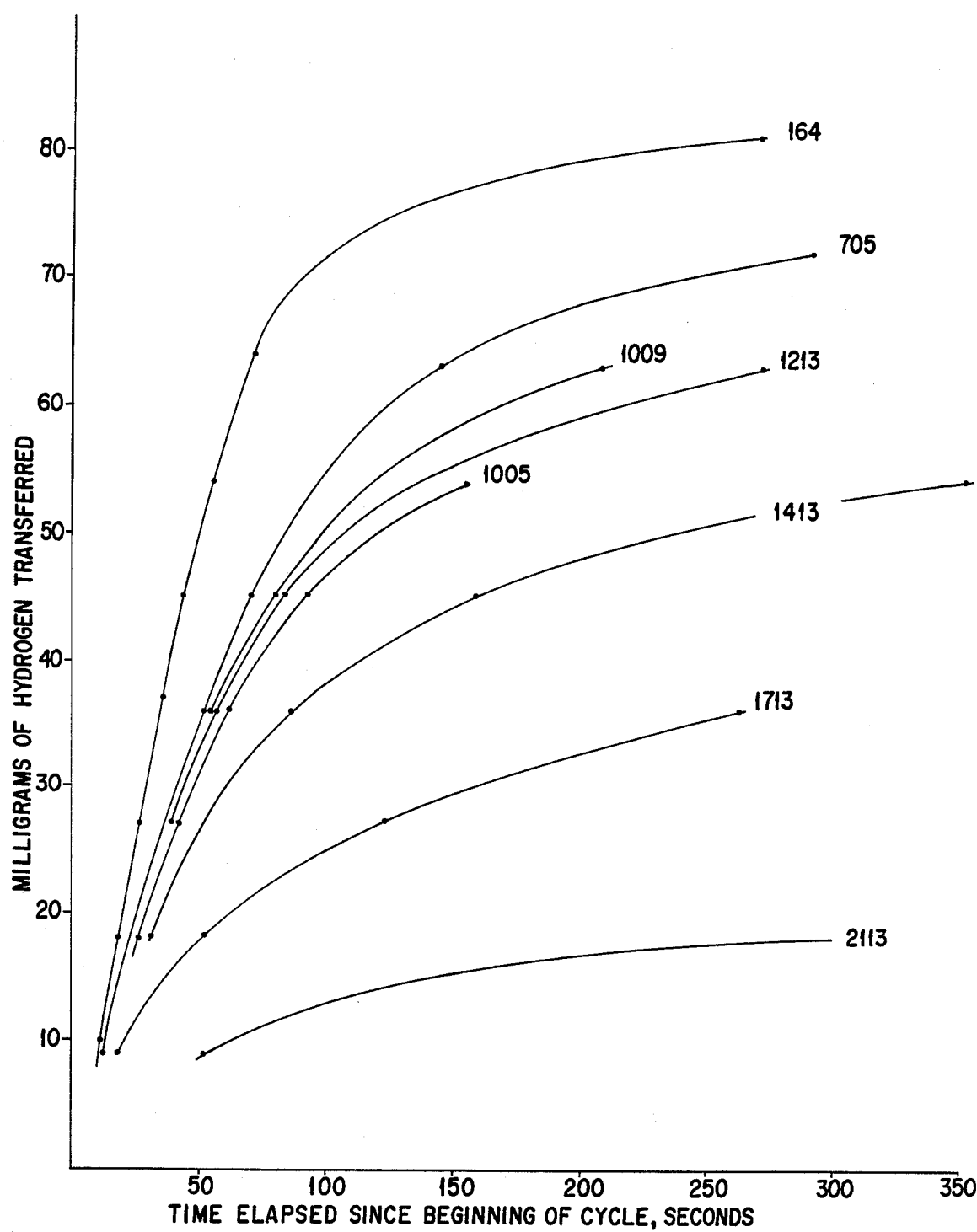
FIG. 1 is a family of curves showing the weight of hydrogen transferred between a pair of tubes, as a function of time, during selected cycles of a multi-cycle hydriding-dehydriding test, employing the method and composition of the present invention.

According to the invention, a metal capable of forming a metal hydride is pulverized, mixed with a binder, and coated onto a support. When the metal absorbs hydrogen to form a hydride, the metal expands and evolves heat. When the hydride evolves hydrogen and reverts to the metal, it contracts and absorbs heat. Thus the binder must be elastic, permeable to hydrogen, and stable at temperatures up to about 260° C. Silicone rubbers, and especially one class of silicone rubbers, meet these requirements. The preferred class of silicone rubbers are those that polymerize at room temperature by reacting with moisture in the air. These are known as RTV (room temperature vulcanizing) rubbers.

Silicone rubber is far more permeable to hydrogen than other common polymers. This fact is known in Table I, which is adapted from the "Polymer Handbook", Second Edition, published by John Wiley and Sons. Table I gives the permeabilities of various polymers. The permeability is defined as $$P = (VT)/(Apt)$$

where
V = volume in cm³ at STP,
T = film thickness in cm,
A = area in cm²,
p = pressure drop in cm of mercury, and
t = time in seconds.

TABLE I

| Polymer of: | Temp., °C. | Permeability × $10^{10}$ |
|---|---|---|
| 1,3 - butadiene | 25 | 42 |
| Chloroprene | 25 | 14 |
| Styrene | 25 | 24 |
| Tetrafluoroethylene | 25 | 10 |
| Trifluorochloroethylene | 20 | 1 |
| Vinyl Acetate | 30 | 9 |
| Vinyl Alcohol | 25 | 0.01 |
| Vinyl Chloride | 25 | 2 |
| Cellulose (Cellophane) | 25 | 0.01 |
| Cellulose Acetate | 20 | 4 |
| Ethyl Cellulose | 20 | 87 |
| Dimethylsiloxane | 0 | 464 |
| Dimethylsiloxane | 25 | 649 |

The last two entries in the table are a silicone rubber.

The prepolymer that is crosslinked to form a silicone rubber is typically polydimethylsiloxane:

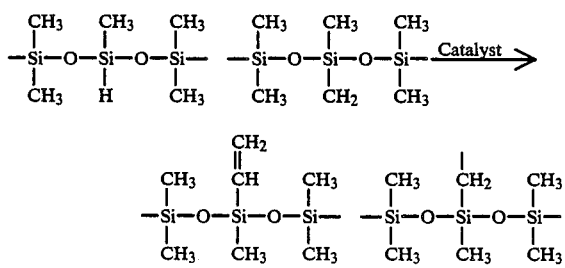

If some of the methyl groups along the chain are replaced by a reactive ligand such as $$CH_2=CH-, HO-, CH_3O-, CH_3\overset{O}{\underset{\|}{C}}O-,$$

H—, NH₂—, and Cl—, the prepolymer chains can undergo crosslinking by reactions such as

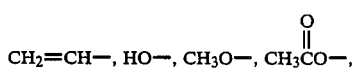

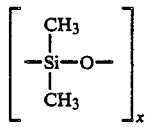

The upper chain has the reactive ligand H- and the lower chain has the reactive ligand CH₂=CH—. These two ligands have reacted together to crosslink the two chains through a —CH₂—CH₂— crosslink. The reaction can be initiated by a catalyst. A typical crosslink density is one crosslink per 325 silicon atoms. Thus, the ligands contribute insignificantly to the overall weight and composition of the polymer.

For binding a metal hydride to a support, the preferred silicone rubber is an RTV rubber that polymerizes by reacting with moisture in the air, without the need for a separate catalyst. The prepolymer has short chains and the end groups are —OH groups. The unpolymerized rubber contains methyl triacetoxysilane, which generates the crosslinks. The triacetoxysilane reacts with moisture in this way:

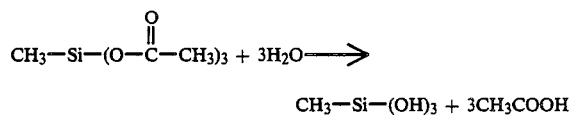

$$CH_3-Si-(OH)_3 + 3CH_3COOH$$

and the polymer is formed in this way:

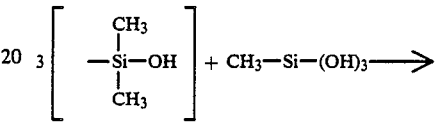

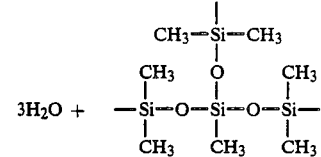

The reaction can take as long as 24 hours, depending on the temperature, the humidity, and the thickness of the layer being polymerized. The cross-linking reaction shown above is only one of several ways by which the polymers can be cross-linked.

The prepolymer which was used in the experiments described below was polydimethylsiloxane. Other silicone rubber prepolymers could also be used. Examples are polymethylphenylsiloxane, polydiphenylsiloxane, and polymethylvinylsiloxane. Moreover, it is believed that copolymers containing the above-identified prepolymers and other components, such as acrylics or polycarbonates, could also be used as binders. Also, it is believed that the methyl groups in the prepolymers described above could be replaced with other alkyls, or with aryls, such as phenyl or benzyl ring structures.

The silicone rubbers used in the following examples were obtained from Dow Corning Corporation. These materials are sold under the trademark "Silastic", and are characterized as follows.

Silastic 382 is a medical grade elastomer. The base is polydimethylsiloxane and silica filler. Polymerization is initiated with a catalyst of stannous octoate. The polymerization is not affected by moisture.

Silastic MDX4-4210 is another medical grade elastomer. It is a two-component system, comprising the basic prepolymer and a curing agent, or cross-linking catalyst, mixed together in the proportions of 10:1.

Silastic 732 is an RTV that polymerizes by reaction with moisture from the air, without the use of a catalyst. It is used as an adhesive or sealant. It contains silica filler.

Silastic 734 is also an RTV adhesive or sealant. It differs from 732 in that it contains less silica, and the chains in the prepolymer are shorter, so that it is less viscous.

The hydride-forming metals (also called hydride precursors), used in the experiments described below, were the alloys $LaNi_5$ and $LaNi_{4.7}Al_{0.3}$. The choice of these alloys is not significant, and other alloys could have been used with similar results.

The following examples describe the performance of various hydride-forming compositions.

EXAMPLE 1

This was the first attempt to bind a pulverized metal alloy to a strip of aluminum using silica as the binder. The metal alloy was $LaNi_5$. It was pulverized by ball milling for 2 hours. The pulverized alloy was mixed with an equal weight of the colloidal silica having the trade name Ludox AS, sold by the DuPont Company. Ludox AS contains 40% silica, so that the weight of metal per weight of silica binder was 2.5. The aluminum strip was prepared by grit blasting with a grit of fine, sharply angular aluminum oxide abrasive. The grit blasted surface has a uniform roughness that resembles fine sandpaper. The mixture of pulverized $LaNi_5$ and colloidal silica was applied to the surface with a soft paint brush. Four coats were applied and the surface was dried after each coat. The loading of alloy on the strip was 0.01 gm per $cm^2$.

The performance of this composition is described following the description of Example 2.

EXAMPLE 2

This was the second attempt to bind a pulverized metal alloy to a strip of aluminum using silica as the binder. The metal alloy was the same as in Example 1, namely $LaNi_5$. This alloy was originally in the form of chunks and splinters. The alloy was mixed with an equal weight of Ludox AS, and the mixture was ball milled for 6 hours. The product was a thick, smooth cream. The aluminum strip was prepared by grit blasting as before. The coating was applied with a soft paint brush, also as before. Six coats were applied and the strip was dried after each coat. The loading of alloy on the strip was 0.016 gm per $cm^2$.

The strips from Examples 1 and 2 were placed in a vessel wherein the strips were subjected to 47 atmospheres of hydrogen at room temperature, followed by a vacuum at room temperature. This sequence defines one cycle of hydriding-dehydriding. After 10 cycles, almost all of the coating had spalled off both strips. Silica is inelastic so that the expansion and contraction due to hydriding and dehydriding causes the silica to become fragmented.

EXAMPLE 3

This was the first attempt to bind a pulverized metal alloy to a strip of metal using silicone rubber as the binder. The metal alloy was $LaNi_5$, ball milled for 2 hours. The silicone rubber was Silastic 732. The rubber and the metal were mixed in a beaker, thinned with xylene, a solvent, and applied to the aluminum strip with a soft paint brush. Six coats were applied, and the strip was dried after each coat. The ratio of the weight of the metal to the weight of the rubber, (not including the weight of the metal strip onto which the composition was applied) was 6.5. The strip was prepared by grit blasting as before. The loading of metal alloy on the strip was 0.024 gm per $cm^2$.

The strip was then subjected to ten cycles of hydriding and dehydriding, as described above. There was no loss of coating during this process. After the ten cycles, the coating was not dislodged by rapping or bending the strip.

EXAMPLE 4

This example was similar to Example 3, except that the weight of hydride-forming metal per weight of Silastic 732 was 11.4, higher than the ratio of 6.5 in Example 3. The technique was the same. The loading of metal alloy on the strip was 0.014 gm per $cm^2$. There was no loss of coating during the 10 cycles of hydriding and dehydriding.

EXAMPLE 5

In this example, the procedure was the same as in Examples 3 and 4, but the weight of metal per weight of Silastic 732 was 6.3. Dichlorobenzene was added to the mixture that was coated onto the strip at 1.2 wt per wt of Silastic 732. The dichlorobenzene volatilized during the drying. The process of volatizing of the dichlorobenzene was intended to generate porosity in the coating. There was no loss of coating after the 10 cycles of hydriding and dehydriding.

EXAMPLE 6

In this example, a different silicone rubber was used, namely Dow Corning Silastic MDX4-4210. Unlike Examples 3–5, the aluminum strip was not grit blasted, and no xylene solvent was used. The weight of metal ($LaNi_5$) per weight of MDX4-4210 was 3.7. The loading of metal on the strip was 0.044 gm per $cm^2$.

There was no loss of coating during the 10 cycles of hydriding and dehydriding. The coating held together, but it was loose, and could be peeled off the strip. Also, some gas bubbles formed under the coating against the strip. Hydrogen may have been evolved more rapidly than it could diffuse through the coating.

EXAMPLE 7

This example was similar to Example 6, except that the strip was grit blasted to achieve better adherence. The loading of metal was also higher than in Example 6, about 0.057 gm per $cm^2$.

There was no loss of coating during the 10 cycles of hydriding and dehydriding. Some gas bubbles formed under the coating, but they were smaller than in Example 6.

EXAMPLE 8

The purpose of Examples 1–7 was to show that silicone rubber might be a suitable binder. The first seven experiments of Example 8 were intended to determine which silicone rubber allows the metal to absorb hydrogen most rapidly. The results of these experiments are summarized in Table II.

For the experiments of this example, the coating was applied to the outside surface of an aluminum tube instead of a strip. The tube had an outside diameter of 4.45 cm (1.75 inch) and a length of 20 cm (8 inches). The central length of the tube (16.3 cm) was grit blasted as before and coated with the metal allow and binder of silicone rubber. The pulverized metal, binder, and solvent were mixed in a beaker and applied to the tube with a soft brush. The ends of the tube were polished smooth so that they could be sealed into the test reactor with a rubber O-ring. Hydrogen pressure was applied to the outside of the tube.

The coating was first cleaned, so as to remove the last vestiges of solvent and atmospheric contaminants, in the following manner. The reactor was evacuated to an absolute pressure of about 0.1 mm of mercury for one hour at room temperature, then evacuated for an additional hour at 100° C., then pressurized to 27 atmospheres of hydrogen at room temperature. The coating was then hydrided and dehydrided 10 times by evacuating at room temperature, and then pressurized to 27 atmospheres of hydrogen. This concluded the cleaning process.

As explained in copending U.S. patent application Ser. No. 695,073, beyond a certain threshold pressure, the metal absorbs a large amount of hydrogen at nearly constant pressure, after which further addition of hydrogen requires a rapidly increasing pressure. The region of nearly constant pressure is known as the "plateau" pressure. The nearly constant pressure along the plateau increases rapidly with temperature, so that the temperature must be held constant while measuring the rate of hydrogen absorption. In these experiments, the temperature was held at 25° C. by water flowing inside the tube.

The ultimate purpose of this example was to measure the rate of hydrogen absorption, and this measurement was made as follows. Hydrogen was supplied to the reactor at a constant pressure equal to some multiple of the nearly constant hydrogen pressure exerted by the partly hydrided metal along the plateau. This multiple is referred to as the "pressure multiple" or the "pressure ratio". The hydrogen was supplied to the reactor, through a pressure regulator, from an accumulator having a known volume and being maintained at constant temperature. The rate of pressure drop in the accumulator is a direct measure of the rate of hydrogen absorption by the metal coating on the tube, at the constant pressure applied by the regulator.

The time taken by the sample to absorb 90% of the maximum amount of hydrogen it can store is one measure of the rate of absorption. The times to reach this 90% point are recorded in Table II. These readings were obtained as follows. Hydrogen was supplied to the sample until no more hydrogen could be absorbed. The amount of hydrogen absorbed, at any given time, was determined with an integrating mass flow meter. A curve was plotted of the amount of hydrogen absorbed versus the time elapsed. The time at which the sample had absorbed 90% of this final amount of hydrogen was determined from the curve. The experiment described above was conducted for tube Nos. 1-7, each having the characteristics and loadings indicated in Table II.

The most significant change between tube Nos. 1 and 2 was in the change of the ratio of the weight of the alloy to the weight of the rubber. The results for tube Nos. 1 and 2, shown in the table, tend to show that increasing this ratio decreased the time to reach 90% of the final uptake of hydrogen, as was expected. The silicone rubber binder used in coating tube No. 3 was the Silastic 732 that had demonstrated good adherence in Example 3. The time to reach the 90% point decreased further, even though the pressure multiple was decreased from 3.4 to 1.8.

There is another significant decrease in the time required for absorption of 90% of final uptake, between tube Nos. 4 and 5. The major change in technique was that tube No. 5 was coated with a single heavy coat, compared with three separate coatings on tube No. 4. Less xylene solvent was used on tube No. 5, and this may have been beneficial. For coating tube Nos. 6 and 7, the silicone rubber binder was Silastic 734, and the ratio of metal alloy to rubber was increased to 20. This increase might not have been possible with Silastic 732, which contains a filler of silica.

The coating applied to tube No. 7 contained ammonium bicarbonate, which was volatilized by heating to 50° C. after the coating had dried, in an attempt to generate porosity in the coating. This had no effect on the time required to reach 90% of hydrogen absorption capacity, however.

Part of the improvement noted during this series of experiments was due to experimental technique. It was found that rapid hydriding and dehydriding cycles just prior to a rate test improved the speed of absorption of hydrogen. This may indicate a surface contamination problem that is remedied by flushing the surfaces through repeated cycling with pure hydrogen and evacuation.

EXAMPLE 9

In this example, we describe a life test that comprised 2900 cycles of hydriding and dehydriding. Tube Nos. 8A and B are the pair of identical tubes that were used in the life test. They were cleaned in situ in the test apparatus by the method already described in Example 8. A fixed inventory of hydrogen was cycled back and forth between the tubes by cycling the temperatures of the tubes between 10° and 55° C. The tube at 55° C. was evolving hydrogen which was being absorbed by the tube at 10° C. The pressure remained nearly constant at about 20 psia. The hydrogen flowing between the tubes passed through a mass flow meter that integrated the total hydrogen that passed from one tube to the other.

FIG. 1 shows a family of curves, each showing the weight of hydrogen passed versus time, measured from the beginning of the particular cycle. The numbers on the curves denote the cycle number. The number 164 means that hydrogen is flowing from tube A to tube B for the 164th time. A complete cycle comprised the steps of transferring the inventory of hydrogen from tube A to tube B and then back to tube A.

For the first 1005 complete cycles, the temperature of the tubes were reversed at intervals of 300 seconds; a complete cycle therefore required 600 seconds. As shown by the curve for cycle No. 164, before there had been any deactivation, the rate of hydrogen flow had flattened out at 300 seconds, after 81 milligrams of hydrogen had been passed. The total hydrogen that corresponds to the weight of metal hydride on each tube is 90 mg. and this is the weight of hydrogen that would have passed if the 300 seconds had been extended to about 1000 seconds.

At cycle 705, the curve was still rising at 300 seconds, and less of the hydrogen had been transferred. At cycle 1005, this deactivation was still more evident. For the second 1100 cycles, the temperatures in the tubes were reversed at the longer interval of 600 seconds, so that the hydrogen had twice as long to flow from tube to tube. This was intended to scavenge the tubes more thoroughly and thereby to increase the weight of the hydrogen transferred. At first, this is just what happened, because the curve for cycles 1009 and 1213 both lie above the curve for cycle 1005. But thereafter, the curves fell away, so that at cycle 2113, the weight of hydrogen transferred at 300 seconds was only about one fourth of what it was in the beginning of the life test. After cycle 2113, a single cycle was extended to 6000 seconds, but the weight of hydrogen passed was still only 37 grams, versus 81 grams in less than 300 seconds at the beginning.

After cycle 2113, the inventory of hydrogen in the system was analyzed. It contained about 10% methane and other decomposition products of the silicone rubber binder. The details of the analysis are given in Example 10. After the samples for analysis were taken, both tubes were heated to 50° C. and evacuated for 2 hours. Then fresh hydrogen was charged to the system.

Figure 2:
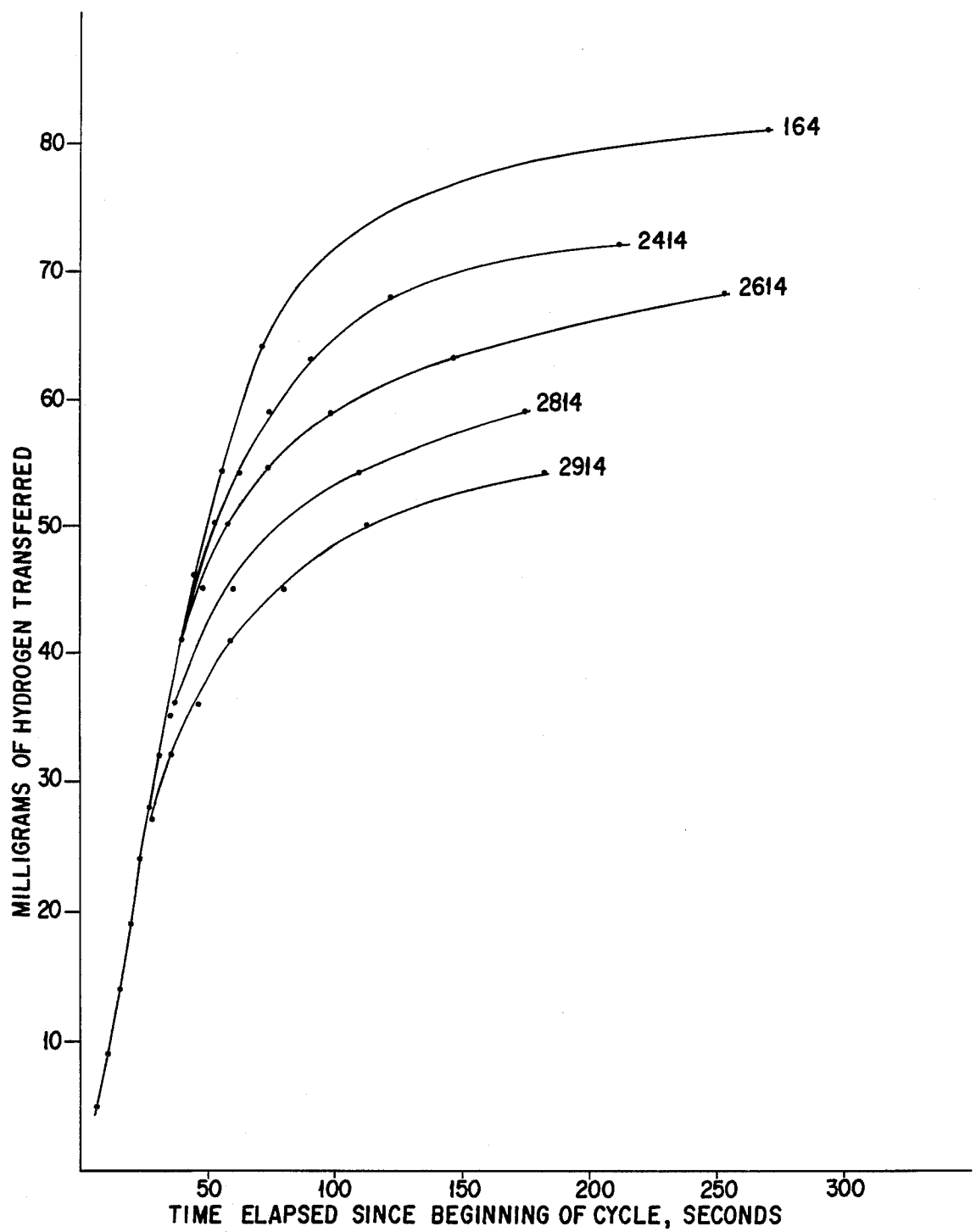
FIG. 2 is a family of curves, similar to FIG. 1, showing the results of a continued test, after the system has been regenerated.

The life test resumed with the interval between temperature reversals being reduced to the original 300 seconds. The curves are shown in FIG. 2. The curve for cycle 164 is plotted also to show the extent of the recovery. Along the curve for cycle 2414, the weight of hydrogen transferred is about 90% of the weight for cycle 164. After this recovery the curves fell away just as in the first 2100 cycles.

EXAMPLE 10

In this example, we describe the analysis of the hydrogen removed from the life test reactor after cycle 2113. Three samples of the hydrogen were taken, and each sample was analyzed by a different method.

Sample 1 was analyzed on a Fourier transform infrared spectrometer. The major impurity in the hydrogen was methane, with a smaller content of $CO_2$ and a still smaller content of water. There was a trace of a heavier component, later identified as hexamethylcyclotrisiloxane (HMCTS).

Sample 2 was analyzed with a gas chromatograph coupled to a mass spectrometer. The heavier component first seen in Sample 1 was identified as HMCTS.

Sample 3 was analyzed with a Perkin-Elmer Infrared Spectrophotometer No. 727B. The content of methane was found to be about 10%. The heavier component was identified again as HMCTS.

EXAMPLE 11

Figure 3:
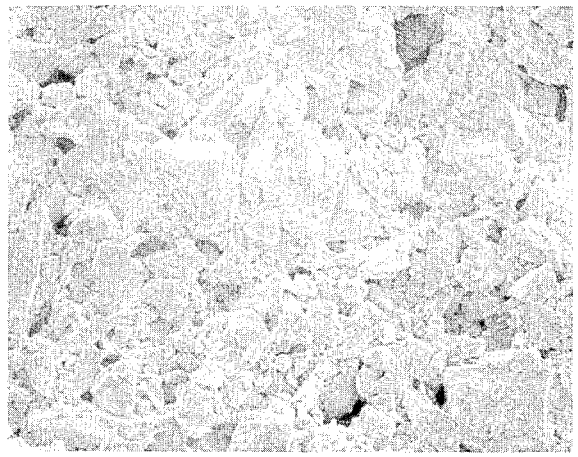
FIG. 3 is a photograph of a sample tube, coated with the composition of the invention, and before the hydriding-dehydriding was begun, at a magnification of 320.
Figure 4:
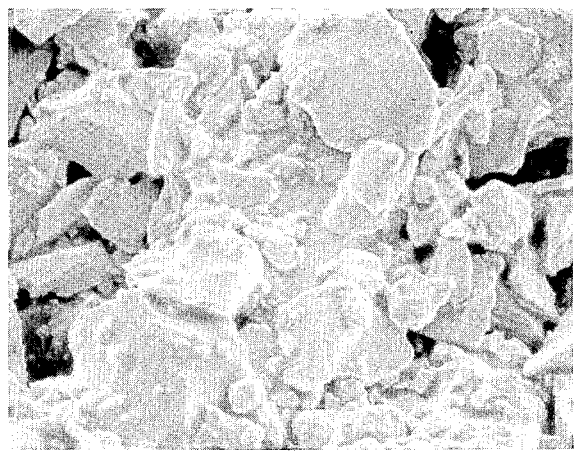
FIG. 4 is a photograph of the same sample tube as in FIG. 3, at a magnification of 1250.

In this example, we describe the inspection of tube Nos. 8A and B after the 2900 cycle life test. For purposes of evaluation and comparison, FIGS. 3 and 4 show the coated tubes before any hydriding or dehydriding was done. FIGS. 3 and 4 are photographs which were made by a scanning electron microscope at magnifications of 320 and 1250, respectively.

A simple scratch test with a fingernail or a knife blade showed that the coating adhered as well as it did before the life test. There was some fine black dust distributed almost uniformly over the interior of the two cells that held the tubes. The black powder may have been fine particles of metal hydride that escaped from the surface of the tubes. The weight of the dust was estimated to be less than 0.01 gm, or less than 0.1% of the coating on the tubes. It was not meaningful to weigh the tubes because they had gained weight from corrosion on the inside surface that contacted the water.

The color of the coating had darkened, except for bands around the tubes at each end. The inspection described below revealed no difference between the light colored bands and the darkened middle region. The color of the end bands was nearly the same as that of the fresh coating.

Figure 5:
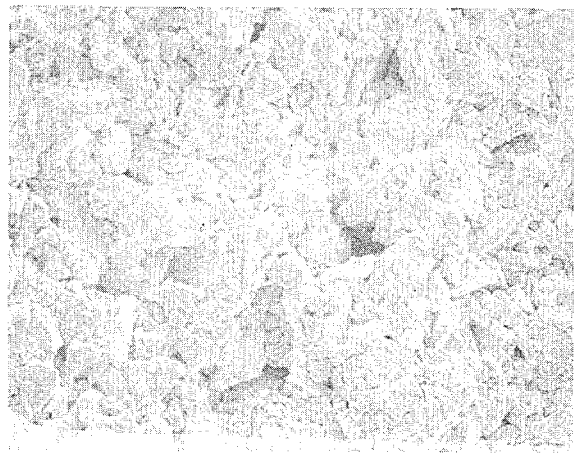
FIG. 5 is a photograph of the darkened portion of a sample tube, coated with the composition of the invention, and subjected to repeated cycles of hydriding and dehydriding, at a magnification of 320.
Figure 6:
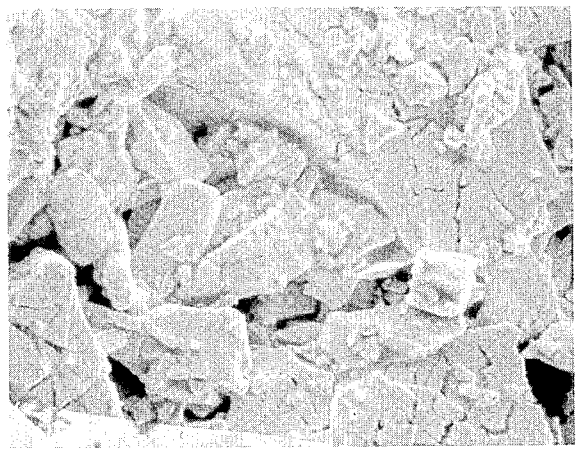
FIG. 6 is a photograph of the same sample tube as in FIG. 5, at a magnification of 1250.
Figure 7:
FIG. 7 is a photograph of the light bands at the ends of the sample tube of FIG. 5, at a magnification of 320.
Figure 8:
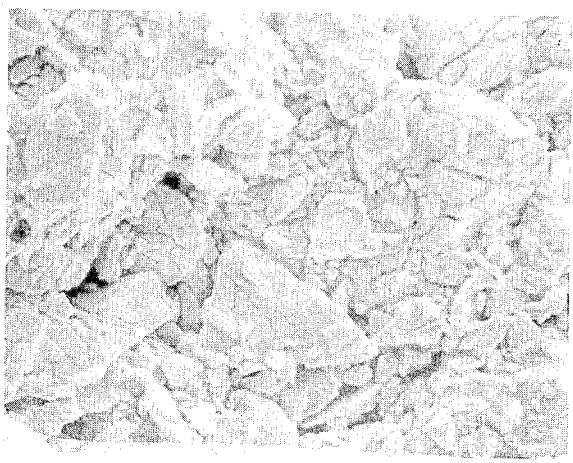
FIG. 8 is a photograph of the same sample tube as in FIG. 7, at a magnification of 1250.

Further examination was made by a scanning electron microscope at magnifications of 320 and 1250. FIGS. 5 and 6 are photographs of the darkened portions, at a magnification of 320 and 1250, respectively. FIGS. 7 and 8 are photographs of the light colored bands, also at a magnification of 320 and 1250, respectively.

At a magnification of 320, the fresh coating, the darkened coating, and the light colored coating in the end bands all have the same appearance. They resemble angular crushed rock with a wide range of particle sizes. There are large angular pores, which are typical for a loosely dumped pile of crushed rock. The silicone rubber is not visible at all, although it must be present as a thin film over all of the particles.

At a magnification of 1250, there are visible differences between the fresh coating and the life tested coatings. A miniscus of silicone rubber is visible where the larger particles touch each other. Some very small particles appear to be bound to some large particles by a film of silicone rubber that anchors the smaller particles. In the fresh coating, no cracks are visible in any of the particles, large or small. In the life tested coatings, the larger particles display a network of cracks which were formed when the particles were hydrided. These are not wide cracks, and the cracked particles are held together in their original shaped by the silicone binder. Just as at a magnification of 320, there is no visible difference between the darkened coating and the lighter coating in the end bands.

The coatings were examined also by X-ray fluorescence. As before, there was no significant difference between fresh coating and the life tested light colored and dark colored coating.

The probable cause for the decline in activity of the sample in the life test is the presence of minute amounts of water, as is explained in the following discussion.

In the presence of water, a metal hydride is highly alkaline. In the presence of alkali, water can cleave a siloxane bond and then add across the bond:

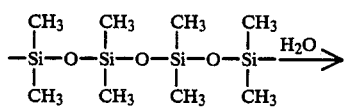

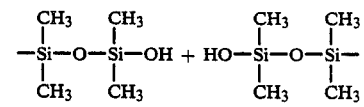

Among the fragments produced by this reaction will be fragments having the structure:

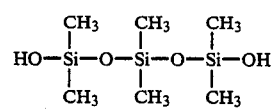

These fragments can cyclize to produce the ring structure of the hexamethylcyclotrisiloxane that was found in the gas samples:

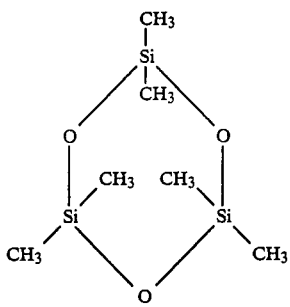

This cyclization reaction evolves the same molecule of water that was consumed in the cleavage reaction. Therefore, a minute amount of water can catalyze the decomposition of any amount of silicone rubber. It is probably not sufficient to dry the initial charge of hydrogen because the first trace of water could be produced by hydrogen attack on the silicone.

The performance of the hydride-forming composition can therefore be improved by removing all traces of water as fast as it is formed and thereby suppressing the cleavage reaction. One way to remove the traces of water is to include a water sorbent in the flow path of the hydrogen. A preferred water sorbent is a molecular sieve. A Type 3A sieve, i.e. a sieve having a pore size of 3 Angstroms, is especially preferred because its small pores absorb water the most strongly. Such a sieve is commercially available.

The methane found in the hydrogen must have been produced by the hydrogenation of methyl groups on the silicone rubber. Methane is inert so that it cannot affect the hydriding-dehydriding reaction chemically. But methane can blanket the coating on the tube and reduce drastically the rate of the reaction. This is probably what happened. The cells that surround the tubes define an annular space having a volume of about 22 milliliters. This volume could contain only about 3% of the 81 milligrams of the hydrogen that is transferred before there is any deactivation. When the hydrogen in the reactor contains 10% methane, this is more than enough methane to fill the annular space and blanket the coating on the tube.

The invention described above can be varied. As stated above, various silicone rubbers, employing different cross-linking agents, can be used. Also, the silicone rubbers can be used with or without copolymerizing components. And, as stated earlier, it is possible to replace the methyl groups in the silicone rubber prepolymers with other groups, such as other alkyls or aryls. The particular sorbent for water can also be changed; a molecular sieve is only one possibility. It is understood that these and other variations are to be considered within the spirit and scope of the following claims.

TABLE II

| | Coating Aluminum Tubes with Pulverized Metal and a Binder of Silicone Rubber[1] | | | | | | | |
|---|---|---|---|---|---|---|---|---|
| Tube No. | 1 | 2 | 3 | 4 | 5 | 6 | 7[3] | 8, A & B |
| Metal Alloy | $LaNi_{4.7}Al_{0.3}$ | $LaNi_{4.7}Al_{0.3}$ | $LaNi_5$ | $LaNi_5$ | $LaNi_5$ | $LaNi_5$ | $LaNi_5$ | $LaNi_{4.7}Al_{0.3}$ |
| Silicone Rubber[4] | 382 | 382 | 732 | 732 | 732 | 734 | 734 | 734 |
| Wt. Alloy/Wt. Rubber | 4.4 | 6.0 | 10 | 12 | 12 | 20 | 20 | 20 |
| Mesh Size of Pulverized Alloy | −200 | −250 | −250 | −250 | −250 | −250 | −250 | −250 |
| Solvent | Hexa[2] | Hexa | Xylene | Xylene | Xylene | Xylene | Xylene | Xylene |
| Wt. Solvent/Wt. Rubber | 1.5 | 1.9 | 3.8 | 4.3 | 2.5 | 2.7 | 3 | 2.9 |
| Number of Coatings | 1 | 1 | 3 | 3 | 1 | 1 | 1 | 1 |
| Gm. of metal applied to tube | 6.85 | 4.89 | 6.62 | 8.65 | 7.00 | 7.88 | 7.33 | 9.6 |
| Gm. Metal per $cm^2$ of tube surface | .030 | .021 | .029 | .038 | .031 | .035 | .032 | .042 |
| Time for metal to absorb 90% of its capacity for hydrogen (in seconds) | 2000 | 600 | 420 | 400 | 240 | 180 | 180 | |
| Pressure ratio at which time for absorption of 90% was measured | 3.4 | 3.4 | 1.8 | 1.8 | 1.8 | 1.8 | 1.8 | |

[1]Outside diameter of tube is 4.45 cm; length of tube coated is 16.3 cm; coated area is 228 $cm^2$
[2]Hexamethyldisiloxane
[3]The coating contained a weight of ammonium bicarbonate equal to the weight of the silicone rubber. The bicarbonate was vaporized from the coating in an attempt to generate porosity.
[4]Dow Corning Silastic 382, 732, and 734

What is claimed is:

1. A system for storing hydrogen in the form of a metal hydride, comprising a hydride-forming metal which is bound to a surface with a silicone rubber, the system defining a flow path for hydrogen, the hydrogen being directed along said flow path to and from the hydride-forming metal, the system including a water sorbent disposed to contact the hydrogen before the hydrogen contacts the silicone rubber, the water sorbent being disposed within said flow path:

2. The system of claim 1, wherein the water sorbent is a molecular sieve.

3. The system of claim 2, wherein the molecular sieve is a sieve having a pore size of about 3 Angstroms.

4. A method of operating a hydriding-dehydriding system, comprising the steps of:
  a. providing a pair of surfaces in a reactor, the surfaces being coated with a mixture of a hydride-forming metal and a silicone rubber binder,
  b. cleaning the surfaces and their coatings by repeatedly evacuating the reactor and pressurizing the reactor with hydrogen, and
  c. cycling hydrogen back and forth along a flow path between the surfaces, so as to cause hydriding and dehydriding, wherein the hydrogen is passed, during the hydriding-dehydriding cycle, through a water sorbent disposed within the flow path.

5. The method of claim 4, wherein the cycling step comprises the steps of alternately raising and lowering the temperatures of the surfaces.

6. The method of claim 5, wherein the binder is selected from the group consisting of polydimethylsiloxane, polymethylphenylsiloxane, polydiphenylsiloxane, and polymethylvinylsiloxane.

7. A method of operating a hydriding-dehydriding system, comprising the steps of:
   a. providing a pair of surfaces in a reactor, the surfaces being coated with a mixture of a hydride-forming metal and a silicone rubber binder, and
   b. repeatedly heating and cooling the surfaces so as to cycle hydrogen back and forth between the surfaces, wherein this cycling step includes the step of removing water from the hydrogen as soon as the water is formed.

8. The method of claim 7, wherein the removing step comprises passing the hydrogen through a water sorbent.

9. The method of claim 7, wherein step (a) is followed by the step of cleaning the surfaces and their coatings by repeatedly evacuating the reactor and pressurizing the reactor with hydrogen.

10. The method of claim 7, wherein the binder is selected from the group consisting of polydimethylsiloxane, polymethylphenylsiloxane, polydiphenylsiloxane, and polymethylvinylsiloxane.

11. A method of operating a hydriding-dehydriding system, comprising the steps of:
   a. providing a pair of surfaces in a reactor, the surfaces being coated with a mixture of a hydride-forming metal and a silicone rubber binder,
   b. cleaning the surfaces and their coatings by repeatedly evacuating the reactor and pressurizing the reactor with hydrogen, and
   c. repeatedly cycling hydrogen back and forth along a flow path between the surfaces, so as to cause hydriding and dehydriding of the hydride-forming metal, wherein the hydrogen is passed, during each hydriding-dehydriding cycle, through a water sorbent disposed within the flow path.

12. A method of operating a hydriding-dehydriding system, comprising the steps of:
   a. providing a pair of surfaces in a reactor, the surfaces being coated with a mixture of a hydride-forming metal and a silicone rubber binder, and
   b. repeatedly heating and cooling the surfaces so as to cycle hydrogen back and forth between the surfaces, wherein this cycling step includes the step of removing water from the hydrogen, during each cycle, as soon as the water is formed.

* * * * *